(12) United States Patent
Ye et al.

(10) Patent No.: US 11,903,106 B2
(45) Date of Patent: Feb. 13, 2024

(54) LED FLASHING CIRCUIT

(71) Applicant: ZHEJIANG DAHUA TECHNOLOGY CO., LTD., Zhejiang (CN)

(72) Inventors: Qiang Ye, Hangzhou (CN); Yongjun Fang, Hangzhou (CN); Chengze Yao, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/647,958

(22) Filed: Jan. 13, 2022

(65) Prior Publication Data

US 2022/0141930 A1    May 5, 2022

Related U.S. Application Data

(63) Continuation of application No. PCT/CN2019/129433, filed on Dec. 27, 2019.

(30) Foreign Application Priority Data

Jul. 26, 2019  (CN) .......................... 201910683335.0

(51) Int. Cl.
*H05B 45/38* (2020.01)
*H05B 45/14* (2020.01)
(Continued)

(52) U.S. Cl.
CPC ............. *H05B 45/14* (2020.01); *G03B 15/05* (2013.01); *H05B 45/325* (2020.01);
(Continued)

(58) Field of Classification Search
CPC ...... H05B 45/38; H05B 45/54; H05B 45/325; H05B 45/335; H05B 45/375; H05B 45/385; H05B 45/3725
See application file for complete search history.

(56) References Cited

U.S. PATENT DOCUMENTS

| | | | |
|---|---|---|---|
| 7,423,389 B2 * | 9/2008 | Lee ........................ | H05B 45/10 315/250 |
| 7,880,404 B2 * | 2/2011 | Deng ................... | H05B 45/397 345/212 |

(Continued)

FOREIGN PATENT DOCUMENTS

| | | |
|---|---|---|
| CN | 201078624 Y | 6/2008 |
| CN | 201995174 U | 9/2011 |

(Continued)

OTHER PUBLICATIONS

International Search Report in PCT/CN2019/129433 dated Apr. 26, 2020, 5 pages.

(Continued)

*Primary Examiner* — Tung X Le
(74) *Attorney, Agent, or Firm* — METIS IP LLC (57) ABSTRACT

A circuit for driving a light-emitting diode (LED) load and a direct current to direct current (DC-DC) converter includes a first sampling sub-circuit, a driving circuit. The first sampling sub-circuit is configured to generate a current signal representing a load current of the LED load. The driving circuit is configured to receive a brightness adjustment signal and a frequency adjustment signal; generate a first control signal, based on the current signal and the brightness adjustment signal, for controlling an output current of the DC-DC converter; and generate a second control signal, based on the frequency adjustment signal, for controlling a switching frequency of the LED load.

20 Claims, 5 Drawing Sheets

(51) Int. Cl.
  *H05B 45/385*  (2020.01)
  *H05B 45/325*  (2020.01)
  *H05B 45/375*  (2020.01)
  *G03B 15/05*   (2021.01)

(52) U.S. Cl.
  CPC ........... *H05B 45/375* (2020.01); *H05B 45/38* (2020.01); *H05B 45/385* (2020.01); *G03B 2215/0567* (2013.01)

(56) References Cited

U.S. PATENT DOCUMENTS

| | | | |
|---|---|---|---|
| 8,058,815 B1 | 11/2011 | Hardy | |
| 2011/0227493 A1 | 9/2011 | Du et al. | |
| 2012/0112655 A1 | 5/2012 | Ryu et al. | |
| 2012/0181931 A1* | 7/2012 | Katsura | G01R 31/2635 315/77 |
| 2013/0250215 A1* | 9/2013 | Sasaki | H05B 45/327 349/69 |
| 2013/0342121 A1* | 12/2013 | Matsumoto | H05B 45/14 315/200 R |
| 2014/0070721 A1* | 3/2014 | Naruo | H05B 45/40 315/224 |
| 2014/0125240 A1 | 5/2014 | Bordin et al. | |
| 2014/0218657 A1* | 8/2014 | Haruta | G09G 3/3426 349/61 |
| 2014/0240967 A1* | 8/2014 | Sharrah | H02J 7/0042 362/183 |
| 2016/0174316 A1* | 6/2016 | Hori | H05B 45/24 315/186 |
| 2018/0279429 A1* | 9/2018 | Sadwick | H05B 45/3725 |
| 2019/0075630 A1 | 3/2019 | Lee et al. | |

FOREIGN PATENT DOCUMENTS

| | | |
|---|---|---|
| CN | 203827560 | 9/2014 |
| CN | 205374953 U | 7/2016 |
| CN | 205793476 U | 12/2016 |
| CN | 106793254 A | 5/2017 |
| CN | 206790728 U | 12/2017 |
| WO | 2021017397 A1 | 2/2021 |

OTHER PUBLICATIONS

Written Opinion in PCT/CN2019/129433 dated Apr. 26, 2020, 5 pages.
First Office Action in Chinese Application No. 201910683335.0 dated Apr. 7, 2020, 20 pages.
The Extended European Search Report in European Application No. 19939287.9 dated Jul. 7, 2022, 10 pages.

* cited by examiner

LED FLASHING CIRCUIT

CROSS-REFERENCE TO RELATED APPLICATION

This application is a continuation of International Patent Application No. PCT/CN2019/129433, filed on Dec. 27, 2019, which claims priority to Chinese Patent Application No. 201910683335.0 filed on Jul. 26, 2019, the contents each of which are incorporated herein by reference in their entirety.

TECHNICAL FIELD

The present disclosure relates to an electrical circuit, and more particularly, to an LED flashing circuit.

BACKGROUND

Currently, with increasing monitoring demand in a plurality of fields (e.g., traffic), more and more lighting devices are employed to supply illumination for monitoring devices (e.g., cameras) working day and night. For example, high-intensity discharge lamps (HID lamps) or light-emitting diodes (LEDs) may work in an exploding mode or a strobe mode to facilitate the shooting of a camera under different conditions.

Specially, LEDs are constant current devices that are sensitive to voltage variation. For LEDs in series and derived by a constant voltage driver, a slight change of voltage may lead to a dramatic brightness change of the LEDs. Sometimes, if an LED needs to change its working mode between the exploding mode and the strobe mode, two different power supply systems and/or two different diver circuits may be employed to supply voltages for the LED in two working modes, respectively, which lacks efficiency and leads to high cost.

SUMMARY

In a first aspect of the present disclosure, circuit for driving a light-emitting diode (LED) load and a direct current to direct current (DC-DC) converter is provided. The circuit may include a first sampling sub-circuit and a driving circuit. The first sampling sub-circuit may be configured to generate a current signal representing a load current of the LED load. The a driving circuit maybe configured to receive a brightness adjustment signal and a frequency adjustment signal; generate a first control signal, based on the current signal and the brightness adjustment signal, for controlling an output current of the DC-DC converter; and generate a second control signal, based on the frequency adjustment signal, for controlling a switching frequency of the LED load.

In some embodiments, the first sampling sub-circuit may include a sampling resistor.

In some embodiments, the circuit may further include a second sampling sub-circuit for generating a voltage signal representing a load voltage of the LED load, wherein the voltage signal is used to control the DC-DC converter to switch between a power-on state and a power-off state.

In some embodiments, the driving circuit may be configured to compare the load voltage with a voltage threshold. In response to a comparison result that the load voltage is higher than the voltage threshold, the circuit may generate a power-off signal to control the DC-DC converter to stop supplying power to the LED load. In response to a comparison result that the load voltage is not higher than the voltage threshold, the circuit may maintain the DC-DC converter to supply power to the LED load.

In some embodiments, the driving circuit may be configured to compare the load current with a current threshold. In response to a comparison result that the load current is higher than the current threshold, the circuit may generate a power-off signal to control the DC-DC converter to stop supplying power to the LED load. In response to a comparison result that the load current is not higher than the current threshold, the circuit may maintain the DC-DC converter to supply power to the LED load.

In some embodiments, the output current of the DC-DC converter may depend on a switching frequency and a duty cycle of a switch in the DC-DC converter.

In some embodiments, the DC-DC converter may be a step-down circuit when an input voltage of the DC-DC converter is not lower than a rated voltage of the LED load.

In some embodiments, the DC-DC converter may be a step-up circuit when an input voltage of the DC-DC converter is not higher than a rated voltage of the LED load.

In some embodiments, the DC-DC converter may be coupled to a power supply circuit and the power supply circuit may include a flyback converter.

In some embodiments, the flyback converter may include a controller configured to control an output voltage of the power supply circuit, the output voltage may vary within a range with a lower limit greater than zero.

In some embodiments, the power supply circuit may be configured to work in a frequency conversion mode.

In some embodiments, the LED load may be configured to work in an exploding mode or a strobe mode.

In some embodiments, a working frequency of the power supply circuit may be lower than 100 kHz when the LED load is working in the strobe mode.

In some embodiments, a working frequency of the power supply circuit may be between 100 kHz to 300 kHz when the LED load is working in the exploding mode.

In some embodiments, the frequency adjustment signal may include an exploding frequency adjustment signal and a strobe frequency adjustment signal.

In some embodiments, the brightness adjustment signal may include an exploding brightness adjustment signal and a strobe brightness adjustment signal.

In some embodiments, a brightness of the LED load in the exploding mode may be greater than a brightness of the LED load in the strobe mode.

In some embodiments, a frequency corresponding to the strobe frequency adjustment signal may be the same as a frequency of a power grid.

In a second aspect of the present disclosure, a method of driving a light-emitting diode (LED) load and a direct current to direct current (DC-DC) converter is provided. The method may include one or more of the following operations. A current signal representing a load current of the LED load may be generated by a sampling sub-circuit. A brightness adjustment signal and a frequency adjustment signal may be received by a driving circuit. A first control signal may be generated based on the current signal and the brightness adjustment signal, for controlling an output current of the DC-DC converter. A second control signal may be generated, based on the frequency adjustment signal, for controlling a switching frequency of the LED load.

In some embodiments, the sampling sub-circuit may include a sampling resistor.

In some embodiments, the method may further includes generating a voltage signal representing a load voltage of the LED load, wherein the voltage signal may be used to control the DC-DC converter switches between a power-on state and a power-off state.

In some embodiments, the controlling the DC-DC converter switches between the power-on state and the power-off state may include comparing the load voltage with a voltage threshold. In response to a comparison result that the load voltage is higher than the voltage threshold, a power-off signal may be generated to control the DC-DC converter to stop supplying power to the LED load. In response to a comparison result that the load voltage is not higher than the voltage threshold, the DC-DC converter may be maintained to supply power to the LED load.

In some embodiments, the controlling the DC-DC converter switches between the power-on state and the power-off state may include comparing the load current with a current threshold. In response to a comparison result that the load current is higher than the current threshold, a power-off signal may be generated to control the DC-DC converter to stop supplying power to the LED load. In response to a comparison result that the load current is not higher than the current threshold, the DC-DC converter may be maintained to supply power to the LED load.

In some embodiments, the controlling the output current of the DC-DC converter may include determining a switching frequency and a duty cycle of a switch in the DC-DC converter.

In some embodiments, the DC-DC converter may be a step-down circuit when an input voltage of the DC-DC converter is not lower than a rated voltage of the LED load.

In some embodiments, the DC-DC converter may be a step-up circuit when an input voltage of the DC-DC converter is not higher than a rated voltage of the LED load.

In some embodiments, the DC-DC converter may be coupled to a power supply circuit and the power supply circuit may include a flyback converter.

In some embodiments, the flyback converter may include a controller configured to control an output voltage of the power supply circuit, the output voltage may vary within a range with a lower limit greater than zero.

In some embodiments, the power supply circuit may be configured to work in a frequency conversion mode.

In some embodiments, the LED load may be configured to work in an exploding mode or a strobe mode.

In some embodiments, working frequency of the power supply circuit may be lower than 100 kHz when the LED load is working in the strobe mode.

In some embodiments, working frequency of the power supply circuit may be between 100 kHz to 300 kHz when the LED load is working in the exploding mode.

In some embodiments, the frequency adjustment signal may include an exploding frequency adjustment signal and a strobe frequency adjustment signal.

In some embodiments, the brightness adjustment signal may include an exploding brightness adjustment signal and a strobe brightness adjustment signal.

In some embodiments, a brightness of the LED load in the exploding mode may be greater than a brightness of the LED load in the strobe mode.

In some embodiments, a frequency corresponding to the strobe frequency adjustment signal may be same as a frequency of a power grid.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid obscuring aspects of the present disclosure unnecessarily. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, sections or assembly of different levels in ascending order. However, the terms may be displaced by other expressions if they may achieve the same purpose.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

Spatial and functional relationships between elements (for example, between layers) are described using various terms, including "connected," "engaged," "interfaced," and "coupled." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. In addition, a spatial and functional relationship between elements may be achieved in various ways. For example, a mechanical connection between two elements may include a welded connection, a key connection, a pin connection, an interference fit connection, or the like, or any combination thereof. Other words used to describe the relationship between elements should be interpreted in a like fashion (e.g., "between," versus "directly between," "adjacent," versus "directly adjacent," etc.).

An aspect of the present disclosure relates to an LED flashing circuit. The LED flashing circuit may include a power supply circuit, a direct current to direct current (DC-DC) converter, an LED load, a driver circuit, and a control circuit. The power supply circuit may provide an input voltage to the DC-DC converter such that the DC-DC converter may further output a current to drive the LED load. The output current of the DC-DC converter may be adjusted based on a brightness adjustment signal and a load current flowing through the LED load, and thus constant current driving can be realized by changing current input to the LED load. At the same time, the driver circuit may control a switching frequency of the LED load based on a frequency adjustment signal, so that the LED load may flash in, for example, an exploding mode and/or a strobe mode. In this regard, it shall be noted that by using one driver circuit to control the working mode of the LED via different adjustment signals, the complexity of the LED flashing circuit may be reduced. In addition, the constant current driving of the LED load may reduce the intensity variation of the LED load and extend the service life of the LED load.

According to some embodiments of the present disclosure, the driver circuit may further provide an overcurrent protection and/or overvoltage protection for the LED load based on a current sampling sub-circuit and/or a voltage sampling sub-circuit. Additionally or alternatively, in some embodiments, the power supply circuit may be configured to work in a frequency conversion mode to satisfy the high power demand in a specific working mode (e.g., the exploding mode).

The following description is provided to help better understanding of noise reduction methods and/or systems. The term "ground" used in this disclosure may refer to earth ground, common ground, analog ground, or digital ground, or the like. This is not intended to limit the scope of the present disclosure. For persons having ordinary skills in the art, a certain amount of variations, changes, and/or modifications may be deducted under the guidance of the present disclosure. Those variations, changes, and/or modifications do not depart from the scope of the present disclosure.

Figure 1:
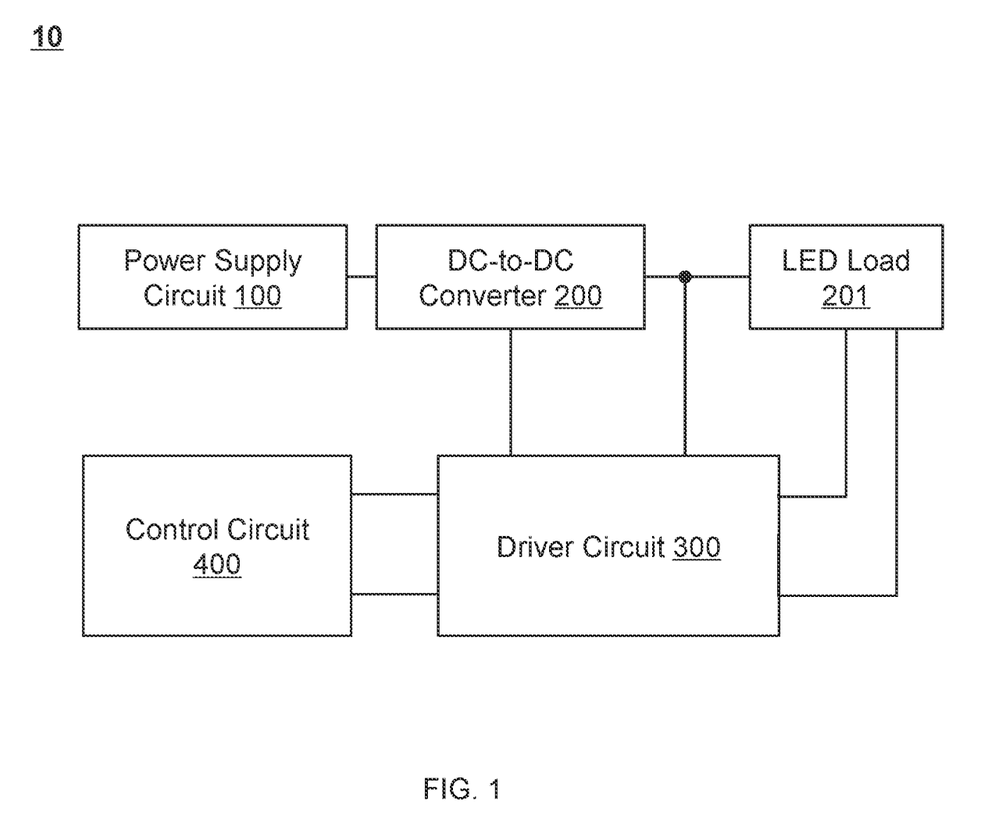
FIG. 1 is a schematic diagram of an exemplary LED flashing circuit according to some embodiments of the present disclosure.

FIG. 1 is a schematic diagram illustrating an exemplary LED flashing circuit 10 according to some embodiments of the present disclosure. The LED flashing circuit 10 may include a power supply circuit 100, a direct current to direct current (DC-DC) converter 200, an LED load 201, a driver circuit 300, and a control circuit 400.

The LED flashing circuit 10 may be applied in a plurality of fields, such as intelligent transportation, security, monitoring system, digital photography, door phone, theftproof alarm, or the like. For example, the LED flashing circuit 10 may be applied in a roadway Automatic Number-Plate Recognition (ANPR) system or License Plate Recognition (LPR) system, devoting light compensation to a camera.

The LED flashing circuit 10 may work in an exploding mode, a strobe mode, or a hybrid mode. As used herein, the exploding mode may be a lighting mode in which a lighting component (e.g., the LED load 201) may present a high brightness in a moment. The exploding of the lighting component may be random or in a regular manner. The exploding mode may supply a high intensity of illumination for a snapshot. The strobe mode may be a lighting mode in which a lighting component (e.g., the LED load 201) may regularly flash with a specific brightness. The flashing frequency and brightness level of the strobe mode may be regulated by a control signal. The hybrid mode may be a superposition of the exploding mode and the strobe mode. That is to say, in the hybrid mode, the LED flashing circuit 10 may work in the exploding mode and the strobe mode simultaneously, presenting different light brightness corresponding to the two modes alternatively.

The power supply circuit 100 may be configured to supply power to the DC-DC converter 200. The power supply circuit 100 may be electrically coupled to a first input end of the DC-DC converter 200 to supply an input voltage to the DC-DC converter 200.

In some embodiments, the power supply circuit 100 may be an alternating current to direct current (AC-DC) converter circuit. In this case, the power supply circuit 100 may receive an AC input and convert the AC input into a DC output. The AC input may be in any frequency, for example, 50 Hz, 60 Hz, 75 Hz, 50~120 Hz, etc.

In some embodiments, the power supply circuit 100 may supply a voltage varying in a specific range. More descriptions regarding the power supply circuit 100 may be found elsewhere in the present disclosure. See, e.g., FIG. 7 and relevant descriptions thereof.

It should be noted that the above descriptions of the power supply circuit 100 are intended to be illustrative, and not to limit the scope of the present disclosure. The specific circuit structure of the power supply circuit 100 can be selected according to actual needs. In some embodiments, the power supply circuit 100 may include an electromagnetic interference (EMI) filter, a rectifier, a capacitor, and a resistor. In some other embodiments, the power supply circuit 100 may include an EMI filter, a rectifier, a transformer, and a resistor.

The DC-DC converter 200 may be configured to convert a source of direct current from one voltage level to another and supply power to the LED load 201. An input end of the DC-DC converter 200 may be electrically coupled to the power supply circuit 100 to receive a direct current from the power supply circuit 100. An output end of the DC-DC converter 200 may be electrically coupled to the LED load 201 to supply a converted direct current. An input voltage of the DC-DC converter 200 may be higher or lower than the output voltage of the DC-DC converter 200.

In some embodiments, the DC-DC converter 200 may include a step-down circuit or a step-up circuit (e.g., a BOOST step-up circuit). As used herein, the step-down circuit is a circuit that an output voltage of the circuit is lower than an input voltage of the circuit and the step-up circuit is a circuit that an output voltage of the circuit is higher than an input voltage of the circuit. For example, if the input voltage of the DC-DC converter 200 (i.e., an output voltage of the power supply circuit 100) is higher than a rated voltage of the LED load 201, the DC-DC converter 200 may employ a step-down circuit. For another example, if the input voltage of the DC-DC converter 200 (i.e., an output voltage of the power supply circuit 100) is lower than the rated voltage of the LED load 201, the DC-DC converter 200 may employ a step-up circuit.

The control circuit 400 may be configured to generate a brightness adjustment signal and a frequency adjustment signal to regulate the operation of the LED load 201. The brightness adjustment signal and the frequency adjustment signal may be any type of signal, for example, an analog signal, a digital signal, a pulse width modulation (PWM) signal, a pulse-duration modulation (PDM) signal, or the like.

The brightness adjustment signal may be configured to control the brightness of the LED load 201 working in a specific mode, for example, an exploding mode, a strobe mode, or a hybrid mode. The brightness adjustment signal may include a strobe brightness adjustment signal and/or an exploding brightness adjustment signal. For example, the brightness adjustment signal may include an exploding brightness adjustment signal to control the brightness of the LED load 201 working in the exploding mode. For another example, the brightness adjustment signal may include a strobe brightness adjustment signal to control the brightness of the LED load 201 working in the strobe mode.

The frequency adjustment signal 302 may be configured to control a switching frequency and a duty cycle of the LED load 201 working in the exploding mode and/or strobe mode. It is well known that a duty cycle (or power cycle) may be a fraction of one period in which a signal or system is active. The period may be the time it takes for a signal to complete an on-and-off cycle. As used herein, the duty cycle may be represented as the duration of on-time $T_{on}$ in an on-and-off cycle, or a ratio of the on-time in the on-and-off cycle. The frequency adjustment signal 302 may include an exploding frequency adjustment signal and/or strobe frequency adjustment signal.

The control circuit 400 may be electrically coupled to the driver circuit 300 for outputting the brightness adjustment signal and the frequency adjustment signal to the driver circuit 300. The control circuit 400 may include a microcontroller unit (MCU), a CPU, a controller, an instruction unit, or any type of circuit that can supply the brightness/frequency adjustment signals.

The driver circuit 300 may be configured to obtain one or more electrical signals. The one or more electrical signals may include the brightness adjustment signal, the frequency adjustment signal, a load current signal representing a load current $I_{led}$ flowing through the LED load 201, a load voltage signal representing a load voltage of the LED load 201, or the like, or any combination thereof.

In some embodiments, the brightness adjustment signal 301 and the frequency adjustment signal may be received from the control circuit 400. For example, a first input end of the driver circuit 300 may be electrically coupled to a first output end of the control circuit 400 for receiving the brightness adjustment signal. A second input end of the driver circuit 300 may be electrically coupled to a second output end of the control circuit 400 for receiving the frequency adjustment signal.

Figure 2:
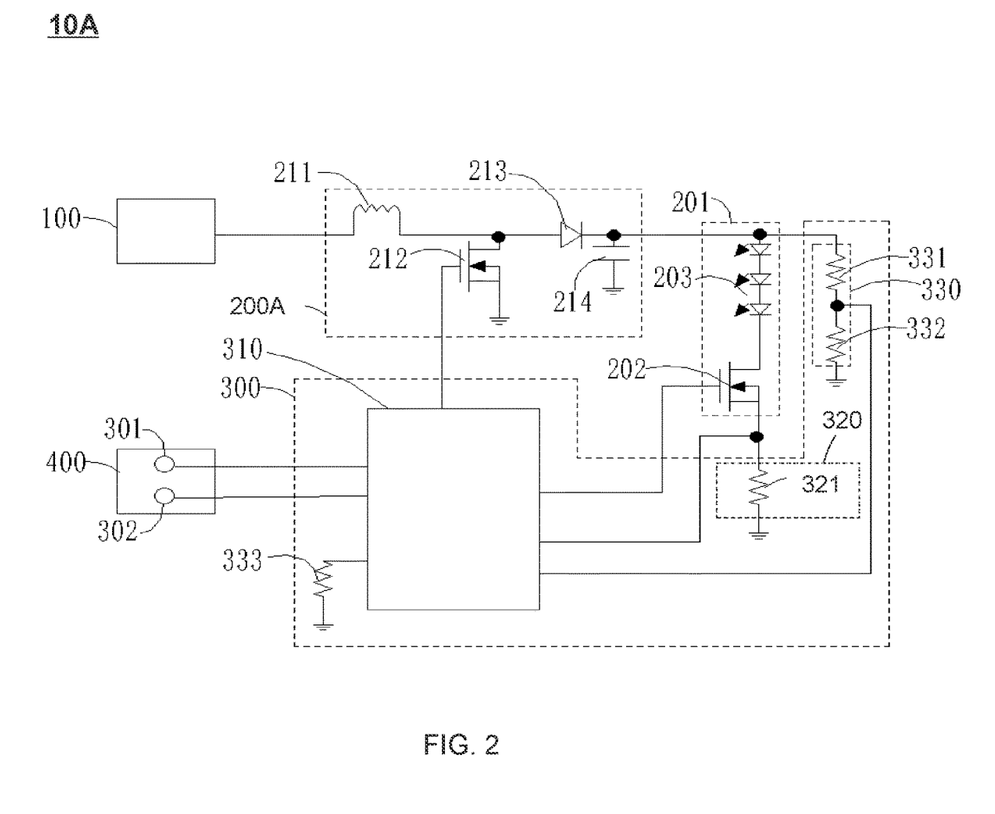
FIG. 2 is a schematic diagram of an exemplary LED flashing circuit according to some embodiments of the present disclosure.
Figure 3:
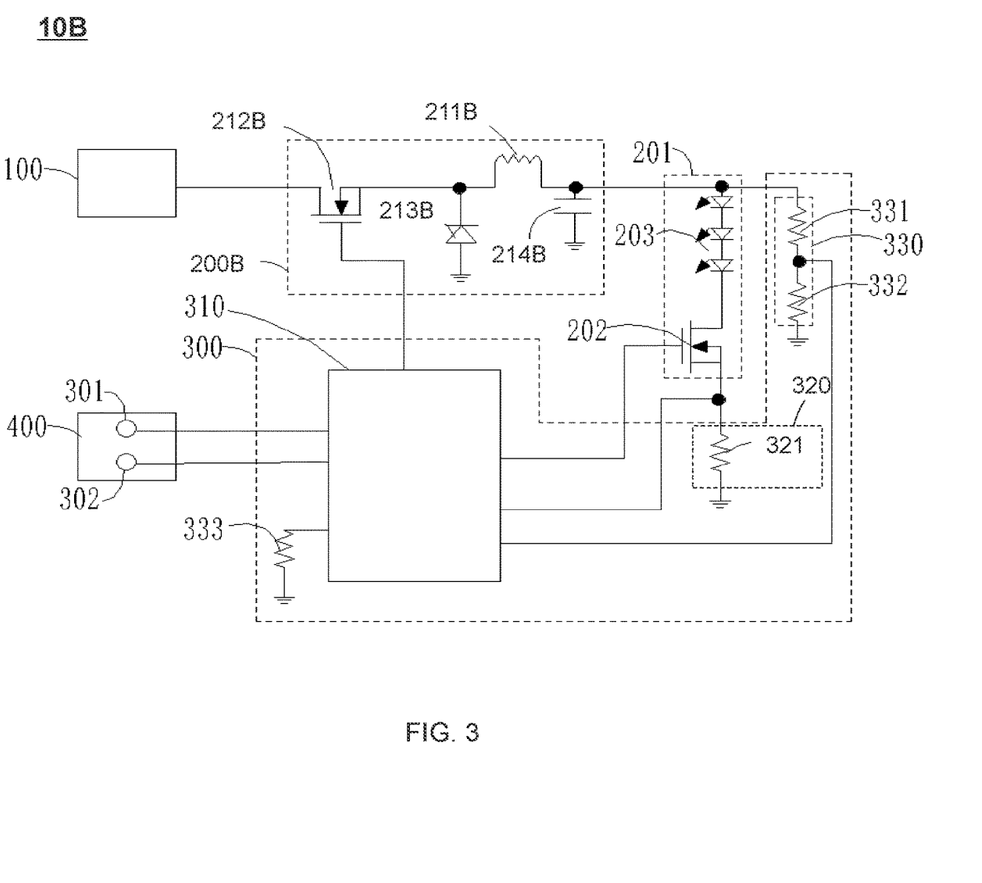
FIG. 3 is a schematic diagram of an exemplary LED flashing circuit according to some embodiments of the present disclosure.

In some embodiments, the load current signal may be obtained by a current sampling sub-circuit (e.g., a resistor 321 as shown in FIGS. 2-3) in the driver circuit 300. For example, a third input end of the driver circuit 300 may be electrically coupled to the LED load 201 through the current sampling sub-circuit. The current sampling sub-circuit may be configured to sample a current flowing through the LED load 201.

In some embodiments, the load voltage signal may be obtained by a voltage sampling sub-circuit (e.g. a voltage sampling sub-circuit 330 as shown in FIGS. 2-3) in the driver circuit 300. For example, a fourth input end of the driver circuit 300 may be electrically coupled to the LED load 201 through the voltage sampling sub-circuit.

The driver circuit 300 may be further configured to control an output current of the DC-DC converter 200, to control the switching frequency and the duty cycle of the LED load 201, and to perform over-current/over-voltage protection for the LED load 201 by generating one or more control signals based on one or more electrical signals. The one or more control signals may include a converter control signal for controlling the DC-DC converter 200 and/or an LED control signal for controlling the LED load 201.

A first output end of the driver circuit 300 may be electrically coupled to a second input end of the DC-DC converter 200 for outputting the converter control signal. The converter control signal may be a pulse width modulation (PWM) signal or a pulse-duration modulation (PDM) signal.

In some embodiments, the driver circuit 300 may generate, based on the load current signal and the brightness adjustment signal, the converter control signal to control the output current of the DC-DC converter 200. For example, the driver circuit 300 may determine a target current $I_{set}$ based on the brightness adjustment signal according to a preset algorithm, and then compare the load current $I_{led}$ of the load current signal with the target current $I_{set}$ to determine a comparison result. Based on the comparison result, the converter control signal may be determined and output to the DC-DC converter 200. Based on the converter control signal, the output current of the DC-DC converter 200 may be changed. For example, if the load current $I_{led}$ is higher than the target current $I_{set}$, the output current of the DC-DC converter 200 may be reduced. If the load current $I_{led}$ is lower than the target current $I_{set}$, the output current of the DC-DC converter 200 may be increased. The changing (i.e., reducing or increasing) of the output current of the DC-DC converter 200 may include changing a peak value or an average value of the output current of the DC-DC converter 200. The changing of the output current of the DC-DC converter 200 may lead to a change of the load current of the LED load 201, thereby the brightness of the LED load 201 may be adjusted. Under such a control process described above, a constant current driving mechanism of the LED load 201 may be achieved.

In some embodiments, the driver circuit 300 may generate, based on the status (e.g., a voltage, a current) of the LED load 201 and a threshold (e.g., a voltage threshold, a current threshold), the converter control signal to control the DC-DC converter 200 to switch between a power-on status and a power-off status. The threshold may be any preset value for achieving an over current/voltage protection. For example, if a load voltage of the LED load 201 determined by a voltage sampling sub-circuit (e.g., a voltage sampling sub-circuit 330) is higher than a voltage threshold, the driver circuit 300 may generate the converter control signal for switching off the DC-DC converter 200 to stop supplying power to the LED load 201. If the load voltage of the LED load 201 is not higher than the voltage threshold, the driver circuit 300 may generate the converter control signal for maintaining the power supply to the LED load 201. For another example, if the load current $I_{led}$ flowing through the LED load 201 is higher than a current threshold, the driver circuit 300 may generate the converter control signal for switching off the DC-DC converter 200 to stop supplying power to the LED load 201. If the load current $I_{led}$ flowing through the LED load 201 is not higher than the current threshold, the driver circuit 300 may generate the converter control signal for maintaining the power supply to the LED load 201. Under the process described above, the overcurrent protection and/or overvoltage protection may be achieved to avoid irreversible damage to the LED load 201.

A second output end of the driver circuit 300 may be electrically coupled to the LED load 201 for outputting the LED control signal. The LED control signal may include an analog signal, a digital signal, a PWM signal, a PDM signal, or the like, or any combination thereof.

In some embodiments, the driver circuit 300 may generate, based on the frequency adjustment signal, the LED control signal to control a switching frequency and/or on-time of the LED load 201. The frequency adjustment signal may include a strobe brightness adjustment signal corresponding to a strobe mode and/or an exploding adjustment signal corresponding to an exploding mode. Under such a controlling mechanism described above, the LED load 201 may be controlled to flash in the strobe mode and/or the exploding mode according to a preset rule. The present disclosures can not only drive the LED load 201 to work in the strobe mode and/or exploding mode, but also reduce the intensity variation and extend the service life of the LED load 201. By using a single driver circuit to control working mode of the LED flashing circuit 10, the circuit structure may be more simplified and universal.

The driver circuit 300 may be any type of circuit that can provide the converter control signal and the LED control signal. For example, the driver circuit 300 may include a driver integrated circuit (IC) (e.g. a driving chip 310 as shown in FIGS. 2-3) and a resistor. For another example, the driver circuit 300 may include a driver IC (e.g. a driving chip 310 as shown in FIGS. 2-3) and a voltage sampling sub-circuit.

The LED load 201 may include a switch, an LED array, or the like. The LED array may include one or more LEDs, which may be arranged in, for example, a linear design, a planar design, a cylindrical design, or a spherical design. Some examples of the one or more LEDs may include, but not limited to, various types of infrared LEDs, ultraviolet LEDs, red LEDs, blue LEDs, green LEDs, yellow LEDs, amber LEDs, orange LEDs, or white LEDs. Features (e.g., wavelength range, chip material, package type, matched photo-sensor, medium-wide emission angle, and high output power) of the one or more LEDs may be same or different.

For example, the wavelength of the one or more LEDs may be any suitable value, such as 808 nm, 830 nm, 840 nm, 850 nm, 870 nm, 940 nm, 980 nm, or the like.

It should be noted that the above descriptions of the LED flashing circuit 10 are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the LED flashing circuit 10 may include one or more additional components. Additionally or alternatively, one or more components of the LED flashing circuit 10 described above may be omitted. For example, in the LED flashing circuit 10, the control circuit 400 may be omitted. As another example, two or more components of the noise control system may be integrated into a single component. Merely by way of example, in the LED flashing circuit 10, the power supply circuit 100 may be integrated into the DC-DC converter 200.

FIG. 2 is a schematic diagram illustrating an exemplary LED flashing circuit 10A according to some embodiments of the present disclosure. The LED flashing circuit 10A may be an embodiment of the LED flashing circuit 10 as shown in FIG. 1.

The LED flashing circuit 10A may include the power supply circuit 100, a DC-DC converter 200A, the driver circuit 300, the control circuit 400, and the LED load 201. The DC-DC converter 200A may be an embodiment of the DC-DC converter 200. More descriptions regarding the power supply circuit 100 may be found elsewhere in the present disclosure. See, e.g., FIGS. 1 and 7 and relevant descriptions thereof.

The DC-DC converter 200A may be configured to receive power from the power supply circuit 100 and supply power to the LED load 201. The DC-DC converter 200A may include an inductor 211, a switch 212, a diode 213, and a capacitor 214.

The inductor 211 may be configured to store and/or release energy. A first end of the inductor 211 may be electrically coupled to the power supply circuit 100 and a second end of the inductor 211 may be electrically coupled to the first end of the switch 212 and a positive end of the diode 213.

The switch 212 may be used to control the inductor 211 to change between an energy-storing status and an energy-releasing status. The switch 212 may be any type of circuit with a switching function, including but not limited to a transistor (e.g., a MOS transistor, an insulated gate bipolar transistor (IGBT)), or the like. The first end of the switch 212 may be electrically coupled to the second end of the inductor 211 and the positive end of the diode 213. A second end of the switch 212 may be electrically connected to the first output end of the driver circuit 300. A third end of the switch 212 may be electrically connected to ground.

The diode 213 may be a two-terminal electronic component that conducts current primarily in one direction. The positive end of the diode 213 may be electrically coupled to the second end of the inductor 211 and the first end of the switch 212. A negative end of the diode 213 may be electrically connected to a first end of the capacitor 214 and the fourth input end of the driver circuit 300.

The capacitor 214 may be a filter capacitor. The first end of the capacitor 214 may be electrically connected to the negative end of the diode 213 and the LED load 201. A second end of the capacitor 214 may be electrically connected to ground.

In some embodiments, the DC-DC converter 200A may receive an input voltage provided by the power supply circuit 100. An output current of the DC-DC converter 200A may be adjusted by switching on or off the switch 212 under the control of the driver circuit 300. During the process of switching on or off the switch 212, energy may be firstly stored in the inductor 211 and subsequently released to the LED load 201. As such, energy transferring from the power supply circuit 100 to the LED load 201 may be achieved through the DC-DC converter 200A. During such a transferring process, the LED load 201 may obtain a constant current, and the intensity variation of the LED load 201 may be reduced.

In some embodiments, the DC-DC converter 200A may include a step-up circuit where an input voltage of the DC-DC converter 200A may be lower than a rated voltage of the LED load 201.

The driver circuit 300 may include a resistor 333, a driving chip 310, a current sampling sub-circuit 320, and a voltage sampling sub-circuit 330. A first end of the resistor 333 may be electrically connected to the driving chip 310, and a second end of the resistor 333 may be electrically connected to ground.

A first input end of the driving chip 310 may be electrically connected to the control circuit 400 to receive a brightness adjustment signal 301. A second input end of the driving chip 310 may be electrically connected to the control circuit 400 to receive a frequency adjustment signal 302. A third input end of the driving chip 310 may be electrically connected to the current sampling sub-circuit 320 to sample a load current flowing through the LED load 201. A fourth input end of the driving chip 310 may be electrically connected to the voltage sampling sub-circuit 330 to sample a load voltage of the LED load 201. A first output end of the driving chip 310 may be electrically connected to a second end of the switch 212 to control the on or off of the switch 212. A second output end of the driving chip 310 may be electrically coupled to a first end of the switch 202.

The driver circuit 300 may be configured to adjust the output current of the DC-DC converter 200 by controlling the on/off status and on-time of the switch 212 based on the load current $I_{led}$ flowing through the LED load 201 and the brightness adjustment signal 301. The load current $I_{led}$ may be sampled by the current sampling sub-circuit 320. In some embodiments, the current sampling sub-circuit 320 may include a resistor 321.

The driver circuit 300 may be further configured to perform an overcurrent protection. For example, the driver circuit 300 may compare the load current $I_{led}$ with a current threshold, and control the on/off status of the switch 212 based on the comparison result, thereby implementing the overcurrent protection for the LED load 201 and avoiding irreversible damage to the LED load 201.

The driver circuit 300 may be further configured to perform overvoltage protection. For example, the driver circuit 300 may compare a load voltage of the LED load 201 (e.g., an anode voltage of the LED load 201, a divided voltage of the anode voltage of the LED load 201) with a voltage threshold, and control the on/off status of the switch 212 based on the comparison result, thereby implementing the overvoltage protection for the LED load 201 and avoiding irreversible damage to the LED load 201. If the load voltage of the LED load 201 is great than the voltage threshold, it may indicate that the LED load 201 is in a broken state. In some embodiments, the load voltage of the LED load 201 may be sampled by the voltage sampling sub-circuit 330.

In some embodiments, the voltage sampling sub-circuit 330 may include a resistor 331 and a resistor 332. The resistor 331 and the resistor 332 may be employed as divided resistors. The voltage sampling sub-circuit 330 may sample an anode voltage of the LED load 201 and convert it into a smaller divided voltage one by the resistor 331 and the resistor 332. A divided voltage of the anode voltage of the LED load 201 may be inputted to the driving chip 310. A connection point between a first end of the resistor 331 and a first end of the resistor 332 may be electrically connected to an input end of the driving chip 310. A second end of the resistor 331 may be electrically connected to the LED load 201 and the output end of the DC-DC converter 200A. A second end of the resistor 332 may be electrically connected to ground.

The LED load 201 may include a switch 202 and an LED array 203. A first end of the switch 202 may be electrically connected to the second output end of the driver circuit 300 to receive a control signal that controls the on or off of the switch. A second end of the switch 202 may be electrically connected to the current sampling sub-circuit 320. A third end of the switch 202 may be electrically connected to a first end of the LED array 203. A second end of the LED array 203 may be electrically coupled to the output end of the DC-DC converter 200 and the second end of the resistor 331.

The switch 202 may be any type of circuit with a switching function, including but not limited to a transistor, a MOS transistor, an insulated gate bipolar transistor (IGBT), or the like. In one embodiment, the driver circuit 300 may adjust the switching frequency of the LED array 203 by switching on or off the switch 202 based on the frequency adjustment signal 302.

In some embodiments, the LED array may include one or more LEDs. More descriptions regarding the LED array may be found elsewhere in the present disclosure. See, e.g., FIG. 1 and relevant descriptions thereof.

The brightness of the LED load 201 may be determined based on the brightness adjustment signal 301 received by the driving chip 310. The brightness adjustment signal 301 may include a strobe brightness adjustment signal corresponding to a strobe mode and/or an exploding brightness adjustment signal corresponding to an exploding mode. The driving chip 310 may determine the brightness of the LED load 201 by determining a target current of the LED load 201. The driver circuit 300 may control the output current of the DC-DC converter 200A such that the current $I_{led}$ flowing through the LED load 201 may be equal to the target current of the LED load 201.

It is well known that the brightness of an LED may be controlled by controlling the amount of current through it. The brightness of the LED load 201 may correspond to the load current $I_{led}$ flowing through the LED load 201. In some embodiments, the load current may be represented by a peak current of the LED load 201. In some embodiments, the peak current $I_{max}$ may be determined according to Equation (1) as below:

$$I_{max} = \frac{V_{cs\_ref}}{R_c} \qquad (1)$$

where $V_{cs\_ref}$ refers to a current sampling reference voltage of the driving chip 310, $R_c$ refers to a resistivity of the resistor 321.

In some embodiments, the brightness adjustment signal 301 may correspond to a reference voltage. In some embodiments, the reference voltage may vary within a voltage range (e.g., 0~2.5V). Corresponding to the voltage range of the reference voltage, the brightness of the LED load may also vary within a range (e.g., 0~100%). For example, when the reference voltage is 1V, it may produce 40% of the maximum brightness of the LED load 201.

Figure 4:
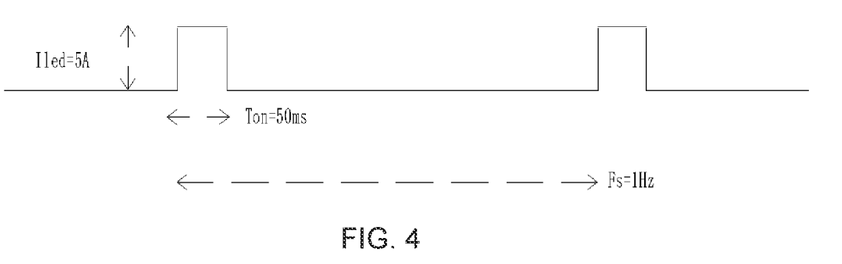
FIG. 4 is a waveform diagram of an LED flashing circuit working in an exploding mode according to some embodiments of the present disclosure.
Figure 6:
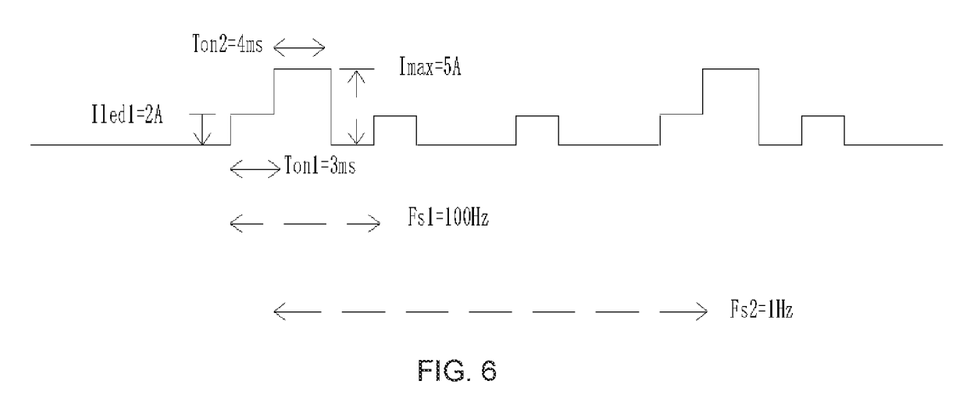
FIG. 6 is a waveform diagram of an LED flashing circuit working in a hybrid mode according to some embodiments of the present disclosure.

In some embodiments, the LED load 201 may produce the maximum brightness (i.e., 100% of the maximum brightness) when it works in an exploding mode. To produce the 100% of the maximum brightness, the current flowing through the LED load 201 may be equal to $I_{max}$, i.e., $I_{led}=I_{max}$. An exemplary maximum current flowing through the LED load 201 may be 5 A as shown in FIG. 4 and FIG. 6.

Figure 5:
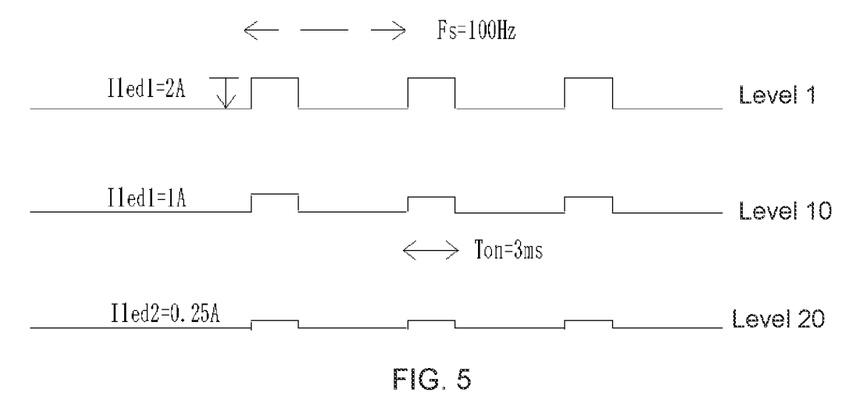
FIG. 5 is a waveform diagram of an LED flashing circuit working in a strobe mode according to some embodiments of the present disclosure.

In some embodiments, the LED load 201 may produce the brightness of level 1 (e.g., 40% of the maximum brightness) when it works in a strobe mode. To produce the 40% of the maximum brightness, the current flowing through the LED load 201 may be equal to 40%*$I_{max}$, i.e., $I_{led}=40\%*I_{max}$. An exemplary current flowing through the LED load 201 which is 40% of the maximum current may be 2 A as shown in FIG. 5. In some embodiments, the brightness of level 1 may represent the maximum illumination in the strobe mode.

In some embodiments, the LED load may produce the brightness of level 10 (e.g., 20% of the maximum brightness) when it works in a strobe mode. To produce the 20% of the maximum brightness, the current flowing through the LED load 201 may be equal to 20%*$I_{max}$, i.e., $I_{led}=20\%*I_{max}$. An exemplary current flowing through the LED load 201 which is 20% of the maximum current may be 1 A as shown in FIG. 5. In some embodiments, the brightness of level 10 may represent a middle illumination in the strobe mode.

In some embodiments, the LED load may produce the brightness of level 20 (e.g., 5% of the maximum brightness) when it works in a strobe mode. To produce the 5% of the maximum brightness, the current flowing through the LED load 201 may be equal to 5%*$I_{max}$, i.e., $I_{led}=5\%*I_{max}$. An exemplary current flowing through the LED load 201 may be 0.25A as shown in FIG. 5. In some embodiments, the brightness of level 1 may represent the lowest illumination in the strobe mode.

In some embodiments, the switching frequency and duty cycle (on-time) of the LED load 201 may be determined based on the frequency adjustment signal 302 received by the driving chip 310. As shown in FIG. 2, the on/off status of the LED load 201 may be controlled by the switch 202, and thus the switching frequency of the LED load 201 may correspond to a switching frequency $F_s$ of the switch 202 in the LED load 201. The frequency adjustment signal 302 may include a strobe brightness adjustment signal and/or an exploding frequency adjustment signal. In some embodiment, the switching frequency of the LED load 201 in a strobe mode may be same as the frequency of a power grid. The frequency of the power grid may be 50 Hz, 60 Hz, 75 Hz, 120 Hz, 50 Hz~120 Hz, or the like.

In some embodiments, the driving chip 310 may receive the frequency adjustment signal 302 (including a switching frequency F_s and an on-time $T_{on}$), and output an LED control signal to the switch 202 to control on/off status of the switch 202, thereby controlling the flashing of the LED load.

FIG. 3 is a schematic diagram illustrating an exemplary LED flashing circuit according to some embodiments of the present disclosure. The LED flashing circuit 10B may be an embodiment of the LED flashing circuit 10 as shown in FIG. 1.

The LED flashing circuit 10B may include the power supply circuit 100, a DC-DC converter 200B, the driver circuit 300, the control circuit 400, and the LED load 201. The DC-DC converter 200B may be an embodiment of the DC-DC converter 200. More descriptions regarding the power supply circuit 100 may be found elsewhere in the present disclosure. See, e.g., FIGS. 1 and 7 and relevant descriptions thereof.

The DC-DC converter 200B may be configured to receive power from the power supply circuit 100 and supply power to the LED load 201. The DC-DC converter 200B may include an inductor 211B, a switch 212B, a diode 213B, and a capacitor 214B.

The inductor 211B may be configured to store and/or release energy. A first end of the inductor 211B may be electrically connected to a second end of the switch 212B. A second end of the inductor 211B may be electrically connected to a first end of the capacitor 214B and the LED load 201.

The switch 212B may be used to control the inductor 211 to change between an energy-storing and an energy-releasing status. The switch 212B may be any type of circuit with a switching function, including but not limited to a transistor (e.g., a MOS transistor, an insulated gate bipolar transistor (IGBT)), or the like. A first end of the switch 212B may be electrically coupled to the power supply circuit 100. The second end of the switch 212B may be electrically coupled to a negative end of the diode 213B and the first end of the inductor 211B. A third end of the switch 212B may be electrically coupled to the first output end of the driver circuit 300.

The diode 213B may be any two-terminal electronic component that conducts current primarily in one direction. The diode 213B may be a commutating diode, which can also be referred to as snubber diode, a suppressor diode, a catch diode or a clamp diode, a flyback diode, or a freewheeling diode. The diode 213B may cause delay drop-out of contacts when the power (e.g. power supply circuit 100) is removed and DC coil (e.g., the inductor 211B) relay is used. The negative end of the diode 213B may be electrically connected to the second end of the switch 212B and the first end of the inductor 211B. A positive end of the diode 213B may be electrically connected to ground.

The capacitor 214B may be a filter capacitor. The first end of the capacitor 214B may be electrically connected to the second end of the inductor 211B, the LED load 201, and the fourth input end of the driver circuit 300. A second end of the capacitor 214B may be electrically connected to ground.

In some embodiments, the DC-DC converter 200B may receive an input voltage provided by the power supply circuit 100. An output current of the DC-DC converter 200B may be adjusted by switching on or off the switch 212B under the control of the driver circuit 300.

In some embodiments, the DC-DC converter 200bB may include a step-down circuit where an input voltage of the DC-DC converter 200A may be higher than a rated voltage of the LED load 201.

The driver circuit 300 may include the resistor 333, the driving chip 310, the current sampling sub-circuit 320, and the voltage sampling sub-circuit 330. A first output end of the driver circuit 300 may be electrically coupled to the switch 212B to control the on or off of the switch 212B.

More descriptions regarding the driver circuit 300 may be found elsewhere in the present disclosure. See, e.g., FIG. 2 and relevant descriptions thereof.

The LED load 201 may include the switch 202 and the LED array 203. A first end of the LED load 201 may be electrically coupled to the second end of the inductor 211B and the first end of the capacitor 214B. More descriptions regarding the LED load 201 may be found elsewhere in the present disclosure. See, e.g., FIG. 2 and relevant descriptions thereof.

It should be noted that the above descriptions of the LED flashing circuits 10A and 10B are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the LED flashing circuits 10A and 10B may include one or more additional components. Additionally or alternatively, one or more components of the LED flashing circuits 10A and 10B described above may be omitted. For example, in the LED flashing circuits 10A and 10B, the control circuit 400 may be omitted. As another example, two or more components of the noise control system may be integrated into a single component. Merely by way of example, in the LED flashing circuits 10A and 10B, the power supply circuit 100 may be integrated into the DC-DC converter 200A or 200B.

FIG. 4 is a waveform diagram of an exemplary LED flashing circuit working in an exploding mode according to some embodiments of the present disclosure. As shown in FIG. 4, the LED load 201 may be controlled to work in the exploding mode, in which a switching frequency $F_s$ may be 1 Hz and the on-time $T_{on}$ may be 50 ms. That is to say, during one cycle (i.e., 1 s), the LED load 201 may be controlled by, for example, the driver circuit 300, to flash 50 ms. The current flowing through the LED load 201 when it flashes may be 5 A.

FIG. 5 is a waveform diagram of an exemplary LED flashing circuit working in a strobe mode according to some embodiments of the present disclosure.

In some embodiments, the LED load 201 may be controlled to work in the strobe mode for providing illumination to a camera with brightness level 1, in which a switching frequency $F_s$ may be 100 Hz and the on-time $T_{on}$ may be 3 ms. In the strobe mode, the current flowing through the LED load 201 when it flashes may be 2 A, which is smaller than the current flowing through the LED load 201 in the exploding mode. As a result, the brightness level 1 produced in the strobe mode may be weaker than the brightness produced in the exploding mode In some embodiments, the LED load 201 may be controlled to work in the strobe mode for providing illumination to the camera with brightness level 10, in which a switching frequency $F_s$ may be 100 Hz and the on-time $T_{on}$ may be 3 ms. In this strobe mode, the current flowing through the LED load 201 when it flashes may be 1 A, and the brightness level 10 is weaker than the brightness level 1.

In some embodiments, the LED load 201 may be controlled to work in the strobe mode for providing illumination to the camera with brightness level 20, in which a switching frequency $F_s$ may be 100 Hz and the on-time $T_{on}$ may be 3 ms. In this strobe mode, the current flowing through the LED load 201 when it flashes may be 0.25 A, and the brightness level 20 is weaker than the brightness level 10.

FIG. 6 is a waveform diagram of an exemplary LED flashing circuit working in a hybrid mode according to some embodiments of the present disclosure.

The hybrid mode may be recognized as a superposition of a strobe mode and an exploding mode. For example, during a specific time interval, the LED load 201 may flash in the strobe mode to provide illumination for making a video, and flash in the exploding mode to provide illumination for snapshot. That is to say, the flashing of the LED load 201 in the strobe mode and the flashing of the LED load 201 in the strobe mode may appear alternately in the specific time interval. In the strobe mode, a switching frequency $F_s$ may be 2 Hz, the on-time $T_{on}$ may be 4 ms, and the current flowing through the LED load 201 may be 5 A. In the exploding mode, a switching frequency $F_s$ may be 100 Hz, the on-time $T_{on}$ may be 3 ms, and the current flowing through the LED load 201 may be 2 A. In some embodiments, the time intervals for the LED load 201 to flash in the exploding mode may be adjustable with respect to the time intervals for the LED load 201 to flash in the strobe mode.

In some embodiments, the LED load 201 may be jointly driven by the driver circuit 300 to flash in the strobe mode and in the exploding mode, which means the control of different flashing modes for the LED 201 may be performed by the same driving circuit. At the same time, the driving circuit 300 may change the brightness of the LED load 201 by changing the output current of the DC-DC converter 200, which is a constant current driving and has the advantages of being simpler and more universal in structure.

Figure 7:
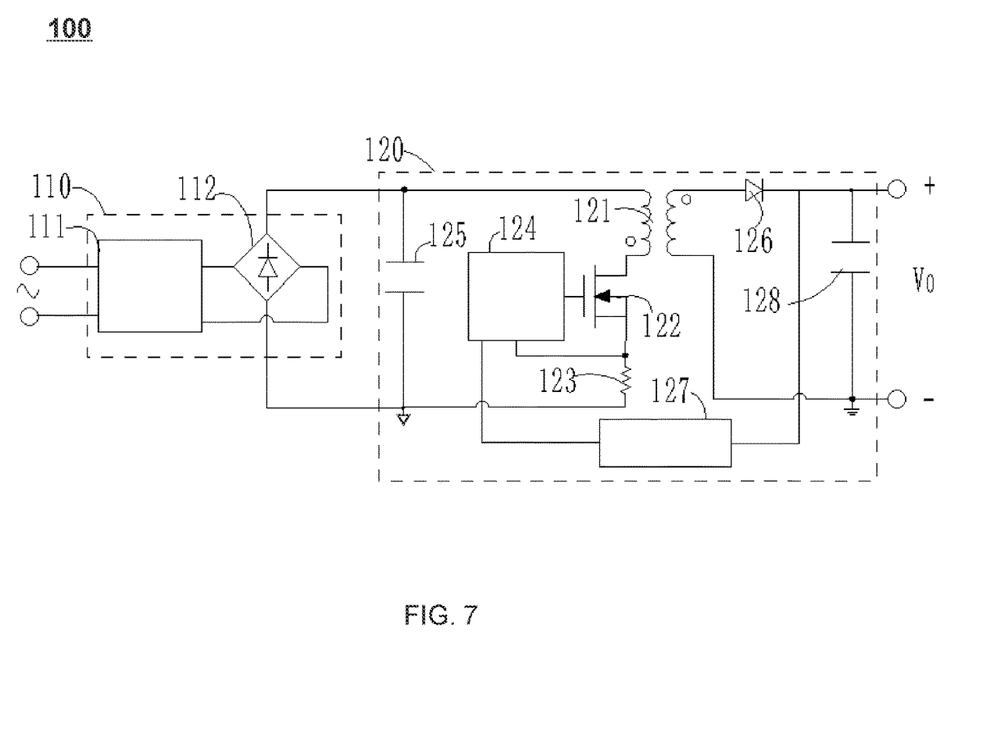
FIG. 7 is a schematic diagram of an exemplary power supply circuit according to some embodiments of the present disclosure.

FIG. 7 is a schematic diagram illustrating an exemplary power supply circuit 100 according to some embodiments of the present disclosure.

The power supply circuit 100 may include a rectifier circuit 110 and a flyback converter 120. An input end of the rectifier circuit 110 may be configured to receive an alternating current. An output end of the rectifier circuit 110 may be electrically coupled to an input end of the flyback converter 120. An output end of the flyback converter 120 may be electrically coupled to the DC-DC converter 200.

The rectifier circuit 110 may include a filter 111 and a rectifier bridge 112. The rectifier circuit 110 may be configured to convert the alternating current into a direct current (e.g., a pulsating direct current). The rectifier bridge 112 may be electrically coupled to the filter 111 and the flyback converter 120. In some embodiments, the filter 111 may include an electromagnetic interference (EMI) filter. After passing the filter 111, the rectifier bridge 112, and the flyback converter 120, the alternating current may be transferred as an input voltage to the DC-DC converter 200.

The flyback converter 120 may include a transformer 121, a switch 122, a resistor 123, a controller 124, capacitors 125, 128, a diode 126, and a feedback circuit 127.

The transformer 121 may be configured to transfer electrical energy from the rectifier circuit 110 to a subsequent circuit (e.g., the DC-DC converter 200). The transformer 121 may include a primary side (also known as an input side) and a secondary side (also known as an output side). A first input end at the primary side of the transformer 121 may be electrically coupled to a positive output end of the rectifier circuit 110 and a first end of the capacitor 125. A second input end at the primary side of the transformer 121 may be electrically coupled to a first end of the switch 122. A first output end at the secondary side of the transformer 121 may be electrically connected to a positive end of the diode 126. A second end at the secondary side of the transformer 121 may be electrically connected to a second end of the capacitor 128 and the ground.

The controller 124 may be configured to control the switch 122 via a PWM control signal. The PWM signal may be determined based on a voltage signal representing a voltage $V_{sense}$ and a feedback signal. A first input end of the controller 124 may be electrically connected to a second end of the switch 122 and a first end of the resistor 123 for receiving the voltage signal representing the voltage $V_{sense}$. A second input end of the controller 124 may be electrically coupled to an output end of the feedback circuit 127 for receiving the feedback signal. The feedback signal may correspond to the output voltage $V_o$ of the power supply circuit 100. An output end of the controller 124 may be electrically connected to a third end of the switch 122 for outputting the PWM control signal.

The switch 122 may be configured to control the on/off status of the transformer 121 based on the PWM control signal. The switch 122 may be any type of circuit with a switching function, including but not limited to a transistor (e.g., a MOS transistor, an insulated gate bipolar transistor (IGBT)), or the like. The first end of the switch 122 may be electrically connected to the second input end of the transformer 121. A second end of the switch 122 may be electrically connected to the resistor 123. The third end of the switch 122 may be electrically connected to the controller 124.

The feedback circuit 127 may be configured to determine a feedback signal corresponding to the output voltage $V_o$ of the power supply circuit 100. The feedback signal may be used to control the output voltage $V_o$ of the power supply circuit 100. An input end of the feedback circuit 127 may be electrically connected to a first end of the capacitor 128 and a negative end of the diode 126. In some embodiments, the feedback circuit 127 may employ a voltage feedback circuit. The output end of the feedback circuit 127 may be electrically connected to the second input end of the controller 124.

The resistor 123 may be configured to sample the voltage $V_{sense}$ for the controller 124. A first end of the resistor 123 may be electrically connected to the second end of the switch 122 and the first input end of the controller 124. A second end of the resistor 123 may be electrically connected to a negative output end of the rectifier circuit 110, a second end of the capacitor 125, and the ground.

The capacitor 125 may be configured to perform the filtering and energy-storing functions. The first end of the capacitor 125 may be electrically connected to the positive output end of the rectifier circuit 110 to receive a direct current outputted by the rectifier circuit 110. The direct current outputted by the rectifier circuit 110 may be filtered by the capacitor 125. For example, the rectifier circuit 110 may turn a pulsating direct current outputted by the rectifier circuit 110 to a smooth direct current. The second end of the capacitor 125 may be electrically connected to the negative output end of the rectifier circuit 110 and the ground.

The capacitor 128 may be configured to perform the filtering and energy-storing functions. For example, the capacitor 128 may supply power to a subsequence circuit when the output voltage of the power supply circuit is pulled down to make the output voltage of the power supply circuit stable. A first end of the capacitor 128 may be electrically connected to a negative end of the diode 126 and the first input of the DC-DC converter 200. A second end of the capacitor 128 may be connected to the ground.

The flyback converter 120 may be configured to output a voltage $V_o$. The output voltage $V_o$ of the flyback converter 120 may be controlled based on the feedback circuit 127 and the controller 124. In some embodiments, the feedback circuit 127 may collect the output voltage $V_o$ from a secondary side of the transformer 121, compare it with a preset target voltage $V_{set}$, and send a comparison result to the controller 124 on the primary side of the transformer 121. The controller 124 may generate the PWM control signal to control the on/off status of the switch 122 such that the output voltage $V_o$ may be equal to the preset target voltage $V_{set}$. In a process of changing the on/off status of the switch 122, energy may be transferred from the primary side of the transformer 121 to the second side of the transformer 121, thereby increasing or reducing the output voltage $V_o$ until it is equal to the preset target voltage $V_{set}$.

In some embodiments, the power supply circuit 100 may be configured to work in a frequency conversion mode for satisfying instantaneous demand for different power consumptions. Power consumption may be different for the LED flashing circuit 10 in different modes. For example, at an exploding moment in the exploding mode, a voltage drop of the LED load 201 may be 110 V, a load current of the LED load 201 may be 5 A, and thus the power consumption may be 550 W. For another example, at a strobe moment in the strobe mode, a voltage drop of the LED load 201 may be 70 V, a load current of the LED load 201 may be 2 A, and thus the power consumption may be 140 W. In some embodiments, by increasing the switching frequency of the switch 122 (i.e., the working frequency of the power supply circuit 100 or the working frequency of the controller 124), energy may be more effectively transferred from the primary side to the secondary side of the transformer 121.

In some embodiments, when the LED load 201 works at an exploding moment in the exploding mode, the output voltage $V_o$ of the power supply circuit 100 may be pulled to a low level or directly to zero. In order to maintain the output voltage $V_o$ of the power supply circuit 100 in a range with a lower limit greater than zero (e.g., $(0.8V_{set}, V_{set})$, $(0.9V_{set}, V_{set})$), a control mechanism based on the voltage $V_{sense}$ and the controller 124 may be employed.

In some embodiments, the controller 124 may employ a reference voltage $V_{cs\_ref1}$ and a reference voltage $V_{cs\_ref2}$, where $V_{cs\_ref2} > V_{cs\_ref1}$. Based on a comparison between the voltage $V_{sense}$ and the two reference voltages (i.e., $V_{cs\_ref1}$, $V_{cs\_ref2}$), a working mode of the LED load 201 may be determined. For each of the working modes, the working frequency of the controller 124, which is corresponding to a switching frequency of the switch 122, may be set in a range to make the output voltage of the power supply circuit 100 stable. When the LED load 201 works in the strobe mode, the voltage $V_{sense}$ may satisfy the condition $V_{sense} < V_{cs\_ref1}$, and the working frequency of the controller 124 (i.e., the working frequency of the power supply circuit 100) may be set to be lower than 100 kHz, thereby the output voltage $V_o$ of the power supply circuit 100 may be in a range of $(0.9V_{set}, V_{set})$.

In some embodiments, when the LED load 201 works in the exploding mode or the hybrid mode, the voltage $V_{sense}$ may satisfy the condition $V_{cs\_ref1} < V_{sense} < V_{cs\_ref2}$, and the working frequency of the controller 124 may be set to higher than 100 kHz but not higher than 300 kHz, thereby the output voltage $V_o$ of the power supply circuit 100 may be in a range of $(0.8V_{set}, V_{set})$.

If the voltage of the power supply circuit 100 is pulled to a low level or even zero, the power supply circuit 100 may need a capacitor with high capacity to supply to the subsequent circuit. In some embodiments, the output voltage $V_o$ of the power supply circuit 100 may be adjusted in the range (e.g., $(0.8V_{set}, V_{set})$, $(0.9V_{set}, V_{set})$), which reduce the energy-storing demand (e.g., via the capacitor 128) of a subsequent circuit (e.g., the DC-DC converter 200) from a front circuit (e.g., the power supply circuit 100). In such a situation, the capacity of the capacitor 128 may be reduced and the cost of the power supply circuit 100 may be saved. In some embodiments, the capacity of the capacitor 128 may be determined according to Equation (2) as below:

$$C_{128} = \frac{2 * P_O * t}{V_O * V_O}, \qquad (2)$$

where $P_o$ refers to the power output by the power supply circuit 100, $V_o$ refers to the output voltage of the power supply circuit 100, and t refers to the time for maintaining the output voltage $V_o$.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A circuit for driving a light-emitting diode (LED) load and a direct current to direct current (DC-DC) converter comprising:
   a first sampling sub-circuit for generating a current signal representing a load current of the LED load; and
   a driving circuit configured to:
   receive a brightness adjustment signal and a frequency adjustment signal;
   generate a first control signal, based on the current signal and the brightness adjustment signal, for controlling an output current of the DC-DC converter; and
   generate a second control signal, based on the frequency adjustment signal, for controlling a switching frequency of the LED load, wherein the current signal representing the load current of the LED load is used to control the DC-DC converter to switch between a power-on state and a power-off state, and the driving circuit is further configured to:

compare the load current with a current threshold;

in response to a comparison result that the load current is higher than the current threshold, generate a power-off signal to control the DC-DC converter to stop supplying power to the LED load; and in response to a comparison result that the load current is not higher than the current threshold, maintain the DC-DC converter to supply power to the LED load.

2. The circuit of claim 1, wherein the first sampling sub-circuit includes a sampling resistor.

3. The circuit of claim 1, further comprising a second sampling sub-circuit for generating a voltage signal representing a load voltage of the LED load.

4. The circuit of claim 1, wherein the output current of the DC-DC converter depends on a switching frequency and a duty cycle of a switch in the DC-DC converter.

5. The circuit of claim 1, wherein the DC-DC converter is a step-down circuit when an input voltage of the DC-DC converter is not lower than a rated voltage of the LED load.

6. The circuit of claim 1, wherein the DC-DC converter is a step-up circuit when an input voltage of the DC-DC converter is not higher than a rated voltage of the LED load.

7. The circuit of claim 1, wherein the DC-DC converter is coupled to a power supply circuit and the power supply circuit includes a flyback converter.

8. The circuit of claim 7, wherein the flyback converter includes a controller configured to control an output voltage of the power supply circuit, the output voltage varying within a range with a lower limit greater than zero.

9. The circuit of claim 7, wherein the power supply circuit is configured to work in a frequency conversion mode.

10. The circuit of claim 1, wherein the LED load is configured to work in an exploding mode or a strobe mode.

11. The circuit of claim 10, wherein a working frequency of the power supply circuit is lower than 100 kHz when the LED load is working in the strobe mode.

12. The circuit of claim 10, wherein a working frequency of the power supply circuit is between 100 kHz to 300 kHz when the LED load is working in the exploding mode.

13. The circuit of claim 1, wherein the frequency adjustment signal includes an exploding frequency adjustment signal and a strobe frequency adjustment signal.

14. The circuit of claim 1, wherein the brightness adjustment signal includes an exploding brightness adjustment signal and a strobe brightness adjustment signal.

15. The circuit of claim 1, wherein a brightness of the LED load in the exploding mode is greater than a brightness of the LED load in the strobe mode.

16. The circuit of claim 1, wherein a frequency corresponding to the strobe frequency adjustment signal is the same as a frequency of a power grid.

17. A method of driving a light-emitting diode (LED) load and a direct current to direct current (DC-DC) converter comprising:

generating, by a sampling sub-circuit, a current signal representing a load current of the LED load;

receiving, by a driving circuit, a brightness adjustment signal and a frequency adjustment signal;

generating, by the driving circuit, a first control signal, based on the current signal and the brightness adjustment signal, for controlling an output current of the DC-DC converter; and generating, by the driving circuit, a second control signal, based on the frequency adjustment signal, for controlling a switching frequency of the LED load, wherein the current signal representing the load current of the LED load is used to control the DC-DC converter to switch between a power-on state and a power-off state, and the method further comprises:

comparing, by the driving circuit, the load current with a current threshold;

generating, by the driving circuit, a power-off signal to control the DC-DC converter to stop supplying power to the LED load in response to a comparison result that the load current is higher than the current threshold; and maintaining, by the driving circuit, the DC-DC converter to supply power to the LED load in response to a comparison result that the load current is not higher than the current threshold.

18. The method of claim 17, further comprising:
generating a voltage signal representing a load voltage of the LED load.

19. The method of claim 17, wherein the controlling the output current of the DC-DC converter includes:
determining a switching frequency and a duty cycle of a switch in the DC-DC converter.

20. The method of claim 17, wherein the LED load is configured to work in an exploding mode or a strobe mode.

* * * * *